United States Patent
McLaughlin et al.

(10) Patent No.: US 6,272,386 B1
(45) Date of Patent: Aug. 7, 2001

(54) SYSTEMS AND METHODS FOR MINIMIZING PEER-TO-PEER CONTROL DISRUPTION DURING FAIL-OVER IN A SYSTEM OF REDUNDANT CONTROLLERS

(75) Inventors: Paul Francis McLaughlin, Hatfield; Joseph P. Felix, Glenside; Norman Raymond Swanson, Doylestown, all of PA (US)

(73) Assignee: Honeywell International INC, Morristown, NJ (US)

( * ) Notice: Subject to any disclaimer, the term of this patent is extended or adjusted under 35 U.S.C. 154(b) by 0 days.

(21) Appl. No.: 09/049,880

(22) Filed: Mar. 27, 1998

(51) Int. Cl.$^7$ .................................................. G05B 9/02
(52) U.S. Cl. ................................................................ 700/82
(58) Field of Search ................... 700/82, 2, 3; 714/10

(56) References Cited

U.S. PATENT DOCUMENTS

| | | | |
|---|---|---|---|
| 4,607,256 | * | 8/1986 | Henzel ............................ 340/825.52 |
| 4,634,110 | * | 1/1987 | Julich et al. ............................ 714/11 |
| 4,872,106 | | 10/1989 | Slater ...................................... 714/13 |
| 4,958,270 | * | 9/1990 | McLaughlin et al. ................. 700/82 |
| 4,959,768 | * | 9/1990 | Gerhart .................................. 700/82 |
| 5,008,805 | * | 4/1991 | Fiebig et al. ........................... 700/79 |
| 5,088,021 | | 2/1992 | McLaughlin et al. ................. 700/82 |
| 5,202,822 | * | 4/1993 | McLaughlin et al. ................. 700/82 |
| 5,270,917 | * | 12/1993 | Kimura .................................. 700/82 |
| 5,313,386 | * | 5/1994 | Cook et al. ............................ 700/82 |
| 5,463,735 | | 10/1995 | Pascucci et al. ..................... 709/222 |
| 5,777,874 | * | 7/1998 | Flood et al. ............................ 700/82 |
| 5,963,448 | * | 10/1999 | Flood et al. ............................ 700/82 |
| 6,070,250 | * | 5/2000 | Yeager et al. .......................... 714/11 |

FOREIGN PATENT DOCUMENTS

| | | |
|---|---|---|
| 0 411 295 | 2/1991 | (EP) . |
| 0 478 291 | 3/1997 | (EP) . |
| 0 478 287 | 4/1997 | (EP) . |
| WO 91 08535 | 6/1991 | (WO) . |

* cited by examiner

Primary Examiner—Paul P. Gordon
Assistant Examiner—Edward F. Gain, Jr.
(74) Attorney, Agent, or Firm—Novakov Davis (57) ABSTRACT

There is disclosed a redundant process controller for use in a process facility having a plurality of process systems that produce process data, wherein the process data are gathered by process controllers associated with the process systems and are exchanged by the process controllers via a network. The redundant process controller is associated with a first selected process system and is capable of receiving process data from at least one remote process controller and intermittently transferring the received process data to the first selected process system. The redundant process controller comprises 1) a primary process controller capable of storing the received process data, wherein the primary process controller transmits the received process data to the first selected process system; and 2) a secondary process controller capable of storing the received process data, wherein the secondary process controller detects failures in the primary process controller and, upon detection of a failure, transmits to the first selected process system the received process data in lieu of the primary process controller.

20 Claims, 6 Drawing Sheets

SYSTEMS AND METHODS FOR MINIMIZING PEER-TO-PEER CONTROL DISRUPTION DURING FAIL-OVER IN A SYSTEM OF REDUNDANT CONTROLLERS

CROSS-REFERENCE TO RELATED APPLICATIONS

The present invention is related to those disclosed in:

1. U.S. patent application Ser. No. 08/920,265, entitled "SYSTEMS AND METHODS FOR ACCESSING DATA USING CYCLIC PUBLISH/SUBSCRIBE SCHEME WITH REPORT BY EXCEPTION" and filed on Aug. 22, 1997;
2. U.S. patent application Ser. No. 08/916,870, entitled "SYSTEMS AND METHODS FOR IMPLEMENTING A DYNAMIC CACHE IN A SUPERVISORY CONTROL SYSTEM" and filed on Aug. 22, 1997;
3. U.S. patent application Ser. No. 08/916,871, entitled "SYSTEMS AND METHODS FOR GENERATING AND DISTRIBUTING ALARM AND EVENT NOTIFICATIONS" and filed on Aug. 22, 1997;
4. U.S. patent application Ser. No. 08/993,336, entitled "SYSTEMS AND METHODS FOR SYNCHRONIZING REDUNDANT CONTROLLERS WITH MINIMAL CONTROL DISRUPTION" and filed on Dec. 19, 1997; and Each reference is commonly assigned to the Assignee of the present invention. The disclosures of these related patent applications are incorporated herein by reference for all purposes as if fully set forth herein.

TECHNICAL FIELD OF THE INVENTION

The present invention is directed, in general, to process control systems and, more specifically, to process control systems that use a publish/subscribe data distribution scheme and which support peer-to-peer control.

BACKGROUND OF THE INVENTION

A present day process facility (e.g., a manufacturing plant, a mineral or crude oil refinery, etc.) is typically managed using a distributed control system. A contemporary distributed control system includes numerous modules that are tailored to monitor and/or control various processes of the facility. Conventional means link these modules together to produce the distributed nature of the control system. This affords increased performance and a capability to expand or reduce (scale) the control system to satisfy changing facility needs.

Process facility management providers, such as HONEYWELL, INC., develop process control systems that can be tailored to satisfy wide ranges of process requirements (e.g., global, local or otherwise) and facility types (e.g., manufacturing, refining, etc.). These providers have two principle objectives. The first objective is to centralize control of as many processes as possible to improve an overall efficiency of the facility. The second objective is to support a common interface that communicates data between various modules controlling or monitoring the processes, and also with a centralized controller or operator center, if any.

Each process, or group of associated processes, has one or more input characteristics (e.g., flow, feed, power, etc.) and one or more output characteristics (e.g., temperature, pressure, etc.) associated with it. Model predictive control ("MPC") techniques have been used to optimize processes as a function of these input and output characteristics. One MPC technique uses algorithmic representations of a process to estimate characteristic values (represented as parameters, variables, etc.) associated with the process in order to better control it. In recent years, physical, economic and other factors have been incorporated into process control systems.

Examples of such techniques are described in: U.S. Pat. No. 5,351,184, entitled "Method of Multivariable Predictive Control Utilizing Range Control;" U.S. Pat. No. 5,561,599, entitled "Method of Incorporating Independent Feedforward Control in a Multivariable Predictive Controller;" U.S. Pat. No. 5,572,420, entitled "Method of Optimal Controller Design of Multivariable Predictive Control Utilizing Range Control;" and U.S. Pat. No. 5,574,638, entitled "Method of Optimal Scaling of Variables in a Multivariable Predictive Controller Utilizing Range Control." The aforementioned patents are commonly owned by the assignee of the present invention and are incorporated herein by reference for all purposes.

The distributed process control systems used to monitor and control a process are frequently linked by common communication pathways, such as by a LAN architecture or by a WAN architecture. When a requesting node needs a datum from a responding node, it issues a request for the datum across the network and the responding node then returns the datum back across the network. This request/respond cycle is repeated as frequently as the requesting node needs the current value of the datum. Inevitably, this leads to data distribution problems on the network as data traffic on the network nears the maximum bandwidth of the network and bottlenecks are created at heavily requested nodes.

U.S. patent application Ser. No. 08/920,265, incorporated by reference above, discloses a unique data distribution system whereby a requesting node subscribes to another node that contains the requested data. The requesting, or "subscribing," node identifies the desired data and specifies a rate at which the desired data is needed from the "publishing" node. Thereafter, the publishing node periodically sends data to the subscriber node without the need for repeated requests for the data from the subscribing node. This reduces the overall data traffic on the network.

The publish/subscribe scheme is further enhanced by a "report by exception" scheme whereby a publisher node sends data to a subscriber node only if the value of the data has changed from the most recent value sent to the subscriber node. If the subscriber node does not receive an updated value of a particular datum, the subscriber node continues to use the most recently sent value of the data. Since data is transferred only when it changes, traffic on the network is further reduced by this "report by exception" scheme.

U.S. patent application Ser. No. 08/993,336 discloses a unique scheme for maintaining data coherency (i.e., "synchronizing") in a redundant process controller. A redundant process controller comprises a primary process controller and a secondary process controller, whereby data modifications in the memory of the primary process controller are mirrored into the memory of the secondary process controller. In the event of a failure of the primary process controller, the secondary process controller may immediately take over for the primary process controller with minimal disruption of process control.

Redundant process control systems that combine a publish/subscribe data distribution scheme and a "report by exception" data distribution scheme frequently encounter process control disruptions whenever a primary process controller "fails over" to a secondary process controller. When a primary process controller fails, either in a publisher or a subscriber, the subscription relationship between a publisher and a subscriber is lost and must be reestablished in order for the secondary process controller to send or receive new data. Additionally, a secondary process controller that is a subscriber must continue to provide process data values to the processing subsystem that is being controlled at the same time that the secondary process controller is assuming control from the primary process controller after a fail over.

Therefore, there is a need in the art for improved control systems capable of switching a secondary process controller into an "active" primary state with minimal control disruption. In particular, there is a need in the art for improved control systems whereby a secondary subscriber process controller can reestablish a subscription relationship with publisher nodes after a failure of a primary process controller. There is a still further need in the art for a secondary subscriber process controller that can continue to provide process data values to a controlled process subsystem while reestablishing subscription relationships with one or more publisher nodes.

SUMMARY OF THE INVENTION

To address the deficiencies of the prior art, the present invention provides, for use in a process facility having a plurality of process systems that produce process data, wherein the process data are gathered by process controllers associated with the process systems and are exchanged by the process controllers via a network, a redundant process controller associated with a first selected process system and capable of receiving process data from at least one remote process controller and intermittently transferring the received process data to the first selected process system. The redundant process controller comprises 1) a primary process controller having a first memory capable of storing the received process data, wherein the primary process controller transmits the received process data to the first selected process system; and 2) a secondary process controller having a second memory capable of storing received process data, wherein the secondary process controller detects failures in the primary process controller and, upon detection of a failure, transmits to the first selected process system the received process data stored in the second memory in lieu of the primary process controller. The secondary process controller, upon switching to the role of primary, uses the last copy of process data tracked from the primary process controller, until the connection between the publisher and subscriber is reestablished.

According to one embodiment of the present invention, the redundant process controller as further comprises a data redundancy controller, wherein the data redundancy controller monitors data stored in the first memory and modifies data stored in the second memory to make the second memory data substantially identical to the first memory data.

In another embodiment of the present invention, the primary process controller maintains a subscription list in the first memory that is used to establish a subscription relationship with the at least one remote process controller, wherein the subscription relationship identifies desired process data gathered by the at least one remote process controller and specifies a rate at which the desired process data is to be transferred to the primary process controller.

In a further embodiment of the invention, the secondary process controller maintains a copy of the subscription list in the second memory and uses the subscription list to re-establish the subscription relationship with the at least one remote process controller after the failure in the primary process controller.

In still another embodiment of the invention, the primary process controller detects failures in the at least one remote process controller and, upon detection of a failure, transmits process data previously stored in the first memory to the first selected process system.

In a still further embodiment of the present invention, the primary process controller detects the failure in the at least one remote process controller by detecting a termination of a network connection with the at least one remote process controller.

In yet another embodiment of the invention, the primary process controller re-establishes the network connection with the at least one remote process controller while transmitting the previously stored process data to said first selected process system.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION

FIGS. 1 through 4, discussed below, and the various embodiments used to describe the principles of the present invention in this patent document are by way of illustration only and should not be construed in a manner that limits the scope of the present invention in its broadest form. Those skilled in the art will understand that the principles of the present invention may be implemented in a wide range of process facilities, and that the various schemes disclosed herein may be implemented in different types of hardware-based or software-based systems, or combinations thereof. The term "or," as it is used herein, is inclusive, meaning and/or.

Figure 1:
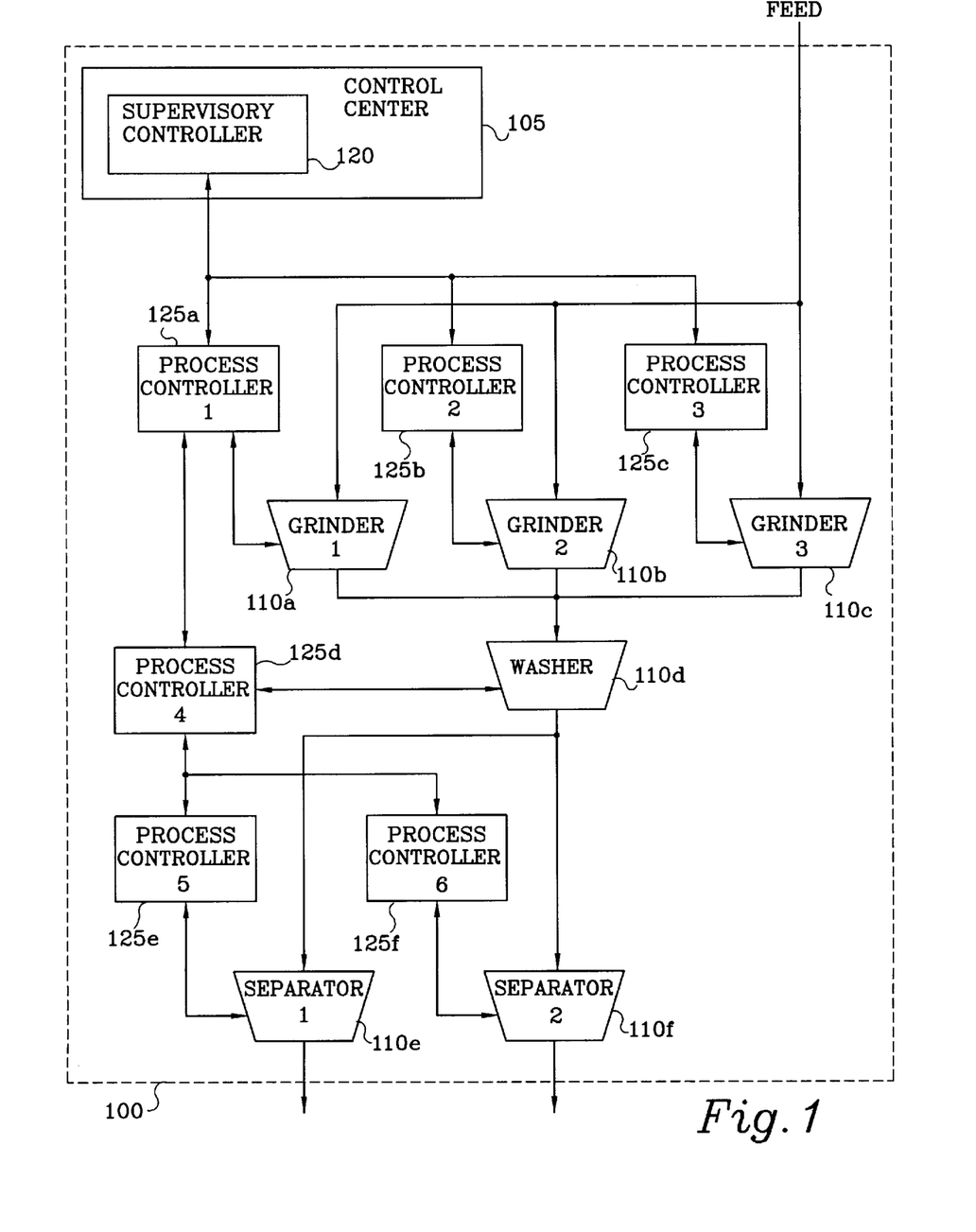
FIG. 1 illustrates a simple block diagram of an exemplary process facility with which a control system according to the principles of the present invention may be used.

Turning initially to FIG. 1, there is illustrated a simple block diagram of an exemplary process facility 100 in which a control system according to the principles of the present invention may be implemented. Exemplary process facility 100 processes raw materials, and includes a control center 105 and six associated processes, items 110a–110f, arranged in three stages. The term "include," as used herein, means inclusion without limitation. Exemplary control center 105 may comprise a central area that is commonly manned by an operator (not shown) for monitoring and controlling the three exemplary process stages. A first process stage includes three raw material grinders 110a–110c that receive a "feed" of raw material and grind it into smaller particles of raw material. The second process stage includes a washer 110d that receives and cleans the ground raw materials to remove residue from the first stage. The third process stage includes a pair of separators 110e and 110f that receive the ground, washed raw materials and separate them into desired minerals and any remaining raw materials.

The exemplary control system includes a supervisory node, or supervisory controller 120, and six process nodes, or process controllers 125a–125f, each of which is implemented in software and executable by a conventional computing system (standalone or network), such as any of HONEYWELL, INC.'s AM K2LCN, AM K4LCN, AM HMPU, AxM, or like systems. Those skilled in the art will understand that the terms "nodes" and "controllers" are used somewhat interchangeably. In point of fact, a node may include one or more controllers, which may suitably be implemented in hardware, software, or firmware, or some suitable combination of the same. In general, the use of nodes/controllers, particularly computers or computing systems, in control systems for process facilities is well known.

Supervisory controller 120 communicates with each of process controllers 125, directly or indirectly, to allow the exchange of information (broadly, "data"). Supervisory controller 120 monitors characteristics (e.g., status, temperature, pressure, flow rate, current, voltage, power, utilization, efficiency, cost and other economic factors, etc.) of associated processes 110, either directly or indirectly through process controllers 125 associated with processes 110. Depending upon the specific implementation, such monitoring may be of an individual process, a group of processes, or the whole facility.

In response to the value(s) of the monitored characteristic(s), supervisory controller 120 generates control data that is communicated via process controllers 125 to associated processes 110 to optimize process facility 100. The phrase "control data," as used herein, is defined as any numeric, qualitative or other value generated by supervisory controller 120 to control (e.g., direct, manage, modify, recommend to, regulate, suggest to, supervise, cooperate, etc.), for example, a particular process, a group of processes, the whole facility, a process stage, a group of stages, a sequence of processes or stages, or the like, to optimize the facility as a whole. In a preferred embodiment, the control data is dynamically generated and is based at least upon a given facility's efficiency, production or economic cost, and most preferably all three.

Process controllers 125 monitor associated processes 110 and operate to varying degrees in accordance with the control data to control the associated processes, and, more particularly, to modify one or more processes and improve the monitored characteristics and the facility as a whole. The relationship between supervisory controller 120 and various ones of process controllers 125 may be master-slave (full compliance), cooperative (varying compliance, such as by using the control data as a factor in controlling the associated processes), or complete disregard (noncompliance). Depending upon the specific implementation and the needs of a given facility, the relationship between supervisory controller 120 and a specific process controller 125 may be static (i.e., always only one of compliance, cooperative, or noncompliance), dynamic (i.e., varying over time, such as within a range between compliance and noncompliance, or some lesser range in between), or switching between static periods and dynamic periods.

Additionally, data may be transferred directly between process controllers 125a–f in a peer-to-peer relationship, as in a LAN network. For example, process controller 4 (node 125d), which controls the washer (item 110d), may request data from process controllers 1–3 (nodes 125a to 125c), which control grinders 1–3 (processes 110a to 110c), in order to determine the rate at which ground raw material is being output therefrom. The washer may thereby adjust the rate at which it washes the ground material. For example, the washer may reduce the amount of power that it uses to wash the ground raw material when the amount of ground raw material being sent to the washer is relatively low. It may even temporarily shut down in order to "hold and wait" for a suitable amount of ground raw material to accumulate before it resumes washing.

As stated above, the amount of data being transferred between the process nodes 125 and between the supervisory node 120 and the process nodes 125 may become quite large in a large process facility 100, particularly in such a networked environment. To minimize overall data traffic and to avoid bottlenecks at heavily requested controllers, the present invention distributes a large quantity of cyclic data in a deterministic manner from a plurality of nodes that contain the data to a plurality of nodes that require the data. This is accomplished using a publication/subscription distribution scheme that allows data to be transferred to a node that needs the data (i.e., a subscriber controller) from a node that contains the data (i.e., a publisher controller) without requiring the subscriber controller to repeatedly (cyclically) request the data.

The publication/subscription scheme is implemented by first establishing one or more subscription lists that are associated with the publisher controllers. In addition, according to an advantageous embodiment, the above-described publish/subscribe relationships are point-to-point thereby allowing for complex and unique publisher/subscriber relationships.

Figure 2:
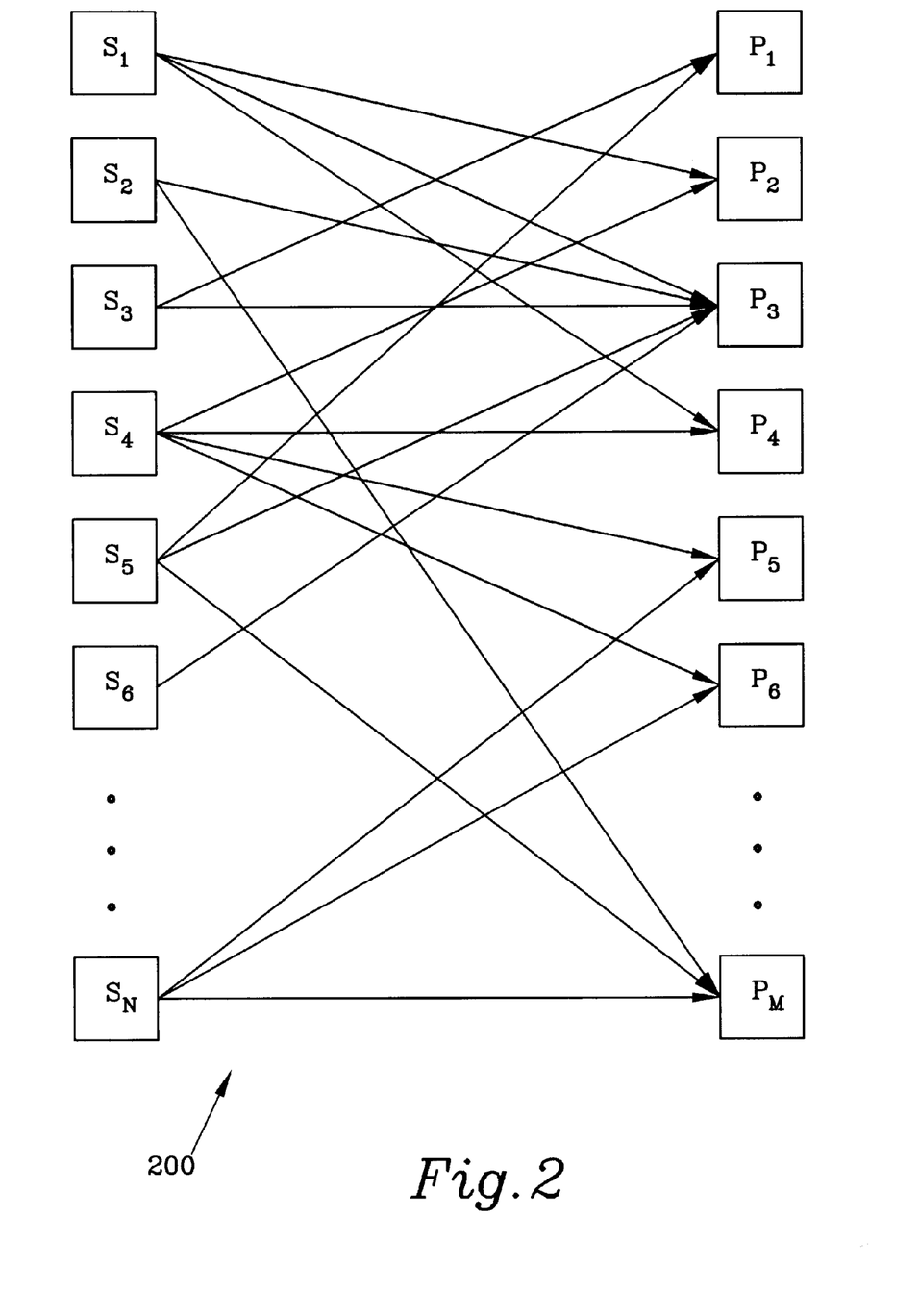
FIG. 2 illustrates exemplary subscription relationships between a plurality of subscriber nodes, $S_1$–$S_N$, that require data and a plurality of publisher nodes, $P_1$–$P_M$, that contain the required data.

Turning now to FIG. 2, illustrated is an exemplary subscription relationship (generally designated 200) between a plurality of subscriber controllers, $S_1-S_N$, that require data and a plurality of publisher controllers, $P_1-P_M$, that contain the required data. The lines connecting the subscriber and publisher controllers (the communication paths among the subscriber and publisher nodes) are representative of subscription messages that are initially sent from the subscriber controllers to the publisher controllers in order to establish one or more subscription lists.

The present invention uses a "scatter" and "gather" mechanism to accomplish the foregoing. A "client," or ultimate subscriber, using application layer services (e.g., Control Data Access, or "CDA," a well-known network service), requests subscription list items from one or more sources (i.e., "publishers"), and the CDA layer transforms such requests into a minimum number of ultimate point-point publication relationships between the subscriber and the publisher(s).

The CDA service performs scattering of request messages and gathering of responses. When the CDA service processes a subscriber list, the list is sorted according to publisher node and requests are sent to corresponding publisher nodes. As responses arrive, or are gathered, by the CDA service, the responses are matched to the initial requests. In an advantageous embodiment, there are multiple Control Execution Environments ("CEEs"). A request thread may be used to parcel requests into subsets that are bounded by the destination address of individual requests. Each individual message has an identifier that associates its respective response thereto.

In advantageous embodiments, the subscription lists may include other indicia that may be used to schedule publication from the publisher node to one or more subscription nodes. For instance, each publisher controller might send specifically required data to each individual subscriber controller at a subscription rate specified by the subscriber list (previously defined by the subscription controller). Subscriber controller $S_1$, for example, sends separate subscription messages to publisher controllers $P_2$, $P_3$, and $P_4$, specifying the specific data that $S_1$ needs from each publisher controller. Each subscription message may also specify a subscription rate for each individual datum required, for example, once per day, hourly, once per second, ten times per second, etc.). Thereafter, $P_2$, $P_3$, and $P_4$ send the required data without further prompting from $S_1$. $S_1$ may respond with separate acknowledgment messages to $P_2$, $P_3$, and $P_4$ after the receipt of each package of required data, thereby informing $P_2$, $P_3$, and $P_4$ that the required data has been received.

Once a subscription relationship is established with a publisher controller, it is unnecessary for the subscriber controller to further request data: the data will automatically be sent at the specified subscription rate. This advantageously reduces the overall amount of network data traffic by eliminating repetitive data request messages. It also avoids bottlenecks at publisher nodes that contain data required by a large number of subscriber nodes.

It is important to note that each of process controllers 125a–125f and supervisory controller 120 may be a subscriber controller with respect to some data and a publisher controller with respect to other data. Other ones of process controllers 124a–125f may operate exclusively as a subscriber controller or exclusively as a publisher controller. Thus, one of process controllers 125a–125f may be represented as a subscriber controller and as a publisher controller in FIG. 2. Additionally, the lines representing subscription lines between the subscriber controllers and the publisher controllers need not be established concurrently or in any particular order—they are independent of one another. Thus, as process facility 100 is expanded or reduced, subscriber controllers and publisher controllers may be added or deleted from the system without interrupting other ongoing subscription relationships. Advantageously, this allows flexible configuration of process facility 100 and allows new controllers to be brought on-line with minimal disruption.

In addition, although the exemplary subscription controllers define or otherwise create their associated subscription lists, such as using scatter/gather schemes, in alternate embodiments, such subscription lists may be defined, at least in part, by the process control system, such as through supervisory controller 120, or an operator. Further, subscription lists may be dynamically modified through incremental additions and deletions whereby a subscriber, or an ultimate client of the application layer, that subscribes to a plurality of data from one or more publishers can dynamically modify or otherwise change one or more subscription relationships without causing the entire subscription to be canceled and restarted. According to this embodiment, the subscriber controller requests that the publication controller add or delete items from the subscription list, such as at a scatter boundary within the ultimate publishers. In addition, such modification may be in response to global or local changes to the process facility (e.g., status, temperature, pressure, flow rate, current, voltage, power, utilization, efficiency, cost and other economic factors, etc.), and may similarly be performed, at least in part, by a controller, the process control system as a whole, or an operator.

Figure 3:
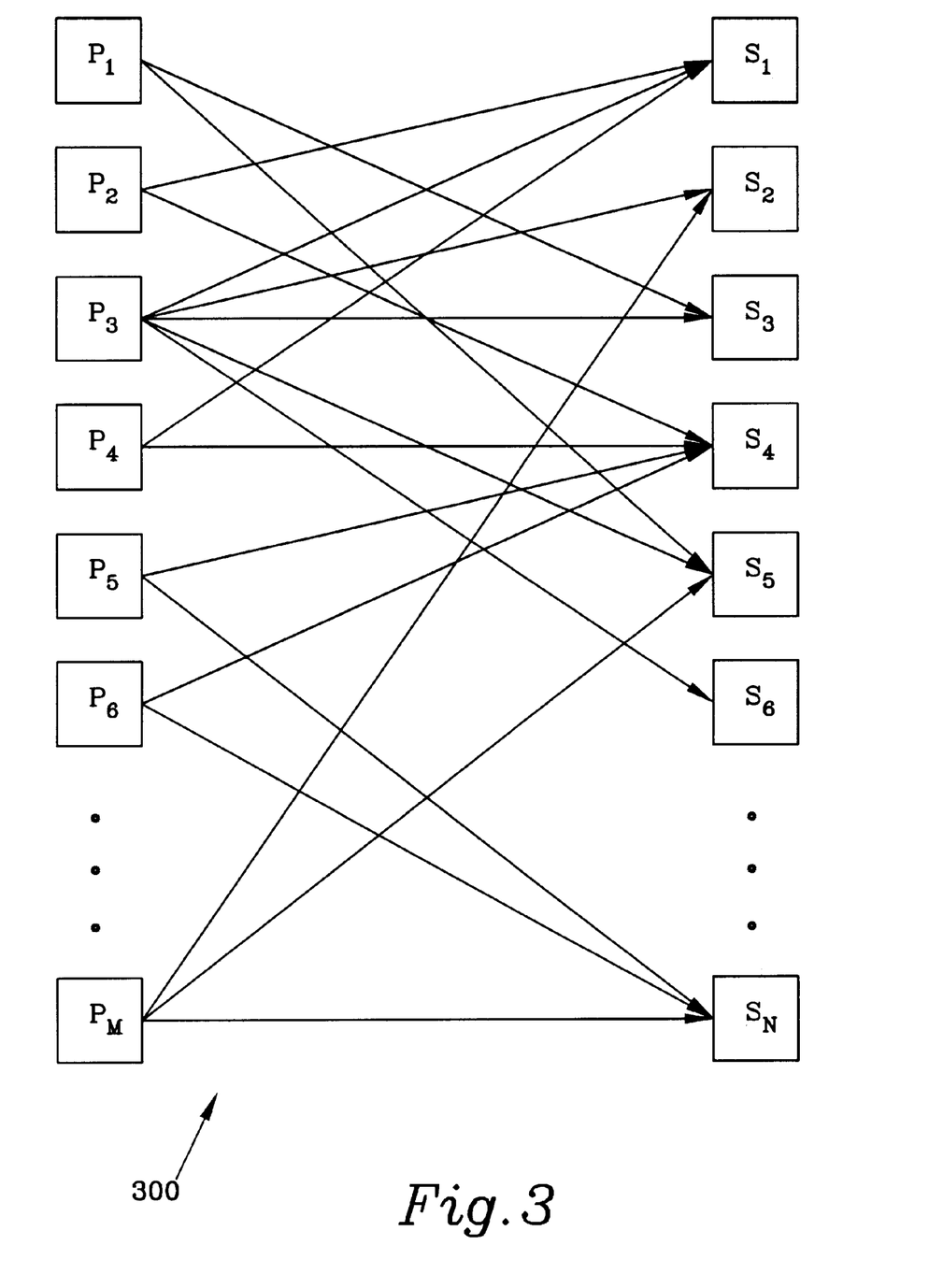
FIG. 3 illustrates exemplary publication relationships between a plurality of subscriber nodes, $S_1$–$S_N$, that require data and a plurality of publisher nodes, $P_1$–$P_M$, that contain the required data.

Turning next to FIG. 3, illustrated is a publication relationship (generally designated 300) between a plurality of subscriber controllers, $S_1$–$S_N$, that require data and a plurality of publisher controllers, $P_1$–$P_M$, that contain the required data. The lines connecting the publisher controllers and the subscriber controllers are representative of data transfers sent from the publisher controllers to the subscriber controllers in accordance with, and in response to, the subscription lists established in the publisher controllers. Request messages are no longer required from the subscriber controllers in order for data to be transferred. The data required by the subscriber controllers is now transferred cyclically by the publisher controllers. However, as noted above, a subscriber controller may modify, replace, or even delete its current subscription relationship with a publisher controller by sending a subscription modification message, a new subscription request, or a subscription delete message.

The above-described publication/subscription scheme for distributing data in process facility 100 may be further improved by integrating a "Report By Exception" ("RBE") scheme with the publication/subscription scheme for distributing data. In a RBE scheme, data is only transferred from a publisher controller to a subscriber controller if the value of a present instance of the data has changed from a past value that was transferred to the subscriber controller in a previous data cycle. For instance, a subscriber controller that does not receive an updated value for "DATUM X" at the time specified by the subscription rate assumes that "DATUM X" has not been changed from its current value and continues to use that value. The RBE scheme therefore greatly reduces data traffic on the network by not publishing (i.e., distributing) what is essentially duplicate data.

The present invention can determine whether or not to transfer data according to different algorithms. In one embodiment of the present invention, a publisher controller may transfer an instance of data only if it is changed at the transfer times determined by the subscription rate. Therefore, multiple changes in the value of a datum during a single cycle will not result in transfer of the data unless the data is different at the update time determined by the subscription rate. In another embodiment of the present invention, a publisher controller may transfer required data only if the change in the value of the required data exceeds a certain minimum threshold. Advantageously, this prevents the transfer of data in response to minute fluctuations in quantities such as power, flow rate, weight, and the like, which fluctuations might be caused merely by the calibration sensitivity of a measuring instrument. In still other embodiments, a publisher controller may transfer a required datum if any change at all occurs during a data cycle.

The publication/subscription scheme and the report-by-exception scheme described above for distributing data in process facility 100 are described in greater detail in U.S. patent application Ser. No. 08/920,265, which application was previously incorporated by reference into the present disclosure.

To increase the overall reliability of process facility 100, some of process controllers 125a–f may be implemented as redundant process controllers. In other words, one or more of process controllers 125a–f may comprise two process controllers: a primary control processor module and a secondary control processor module. The primary control processor module is responsible for executing the "foreground" control tasks associated with one of processes 110a–f. The secondary control processor module remains passive with respect to processes 110a–f, but is continually updated with "synchronization" data from the primary control processor module.

Figure 4:
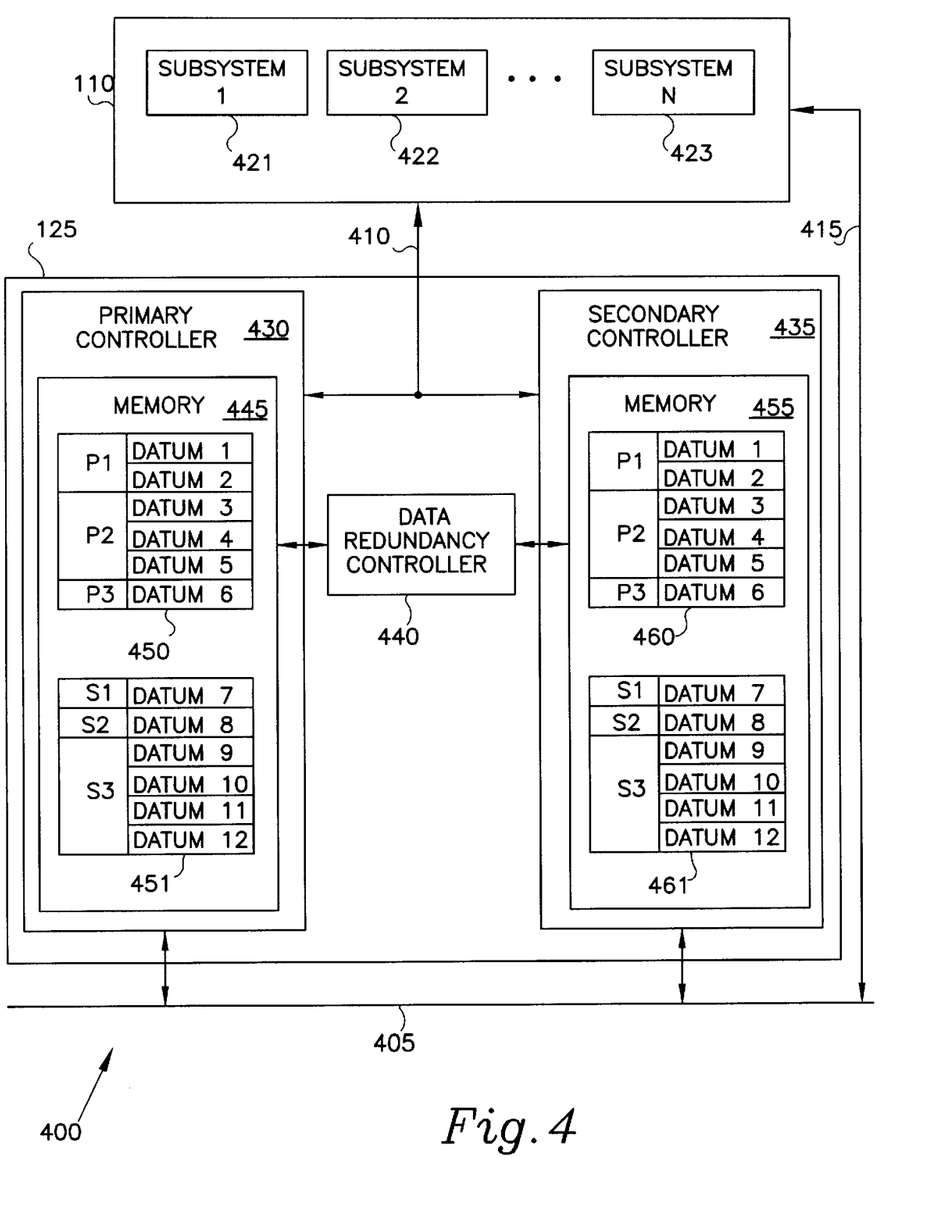
FIG. 4 illustrates an exemplary redundant process controller according to one embodiment of the present invention.

FIG. 4 illustrates an exemplary redundant process controller 400 according to one embodiment of the present invention. Redundant process controller 400 comprises a process controller 125 for controlling process 110. Process 110 contains N subsystems that exchange process data with other process controllers in process facility 100. This data exchange is facilitated by process controller 125. Process controller 125 sends process data to, and receives process data from, the other process controllers on the network via network link 405. Process controller 125 also sends process data to, and receives process data from, process 110 via bus 410. Optionally, process controller 125 may exchange process data with process 110 via network link 405 and network link 415.

Process controller 125 comprises a primary process controller 430 and a secondary process controller 435 that operate in a redundant configuration. That is, under normal operating conditions, primary process controller 430 is responsible for exchanging process data via network link 405 and providing data via bus 410 (or network links 405 and 415) to the subsystems 421, 422 and 423 in process 110. Hereafter, subsystem 421 may be referred to as "Subsystem 1", subsystem 422 may be referred to as "Subsystem 2", and subsystem 423 may be referred to as "Subsystem N".

In order to obtain process data requested by Subsystems 1–N in process 110, primary process controller 430 creates a subscribed data table 450 in memory 445 that is used to establish subscription relationships with, for example, three publisher process controllers, arbitrarily designated P1, P2 and P3. In the exemplary embodiment, primary process controller 430 establishes a first subscription relationship with publisher P1 for the data values DATUM 1 and DATUM 2. Primary process controller 430 establishes a second subscription relationship with publisher P2 for the data values DATUM 3, DATUM 4 and DATUM 5. Primary process controller 430 establishes a third subscription relationship with publisher P3 for the data value DATUM 6. Each of the subscription relationships also includes a cyclic subscription rate (e.g., 100 milliseconds (ms), 200 ms., 500 ms., 1000 ms., etc.).

After these subscription relationships are established, publisher process controller P1 contains a subscription for process controller 125 that causes publisher P1 to transfer values of DATUM 1 and DATUM 2 at the periodic rate established by process controller 125 as part of the subscription relationship. Similarly, publishers P2 and P3 transfer data values for DATUM 3, DATUM 4, DATUM 5, and DATUM 6 at the periodic rates established by process controller 125 as part of the subscription relationships with publisher P2 and publisher P3.

As noted above, each process controller 125a–f in FIG. 1 may be a subscriber with respect to some data and a publisher with respect to other data. In this regard, primary process controller 430 in FIG. 4 also creates a subscription list 451 of process controllers that have subscribed to process controller 125 for certain process data generated by process 110. In the exemplary embodiment, subscription list 451 contains subscriptions from, for example, three subscriber process controllers, arbitrarily designated S1, S2, and S3. Primary process controller 430 has received a first subscription from subscriber S1 for the data value DATUM 7. Primary process controller 430 has received a second subscription from subscriber S2 for the data value DATUM 8. Primary process controller 430 has received a third subscription from subscriber S3 for the data values DATUM 9, DATUM 10, DATUM 11, and DATUM 12. Each of these received subscriptions also includes a cyclic subscription rate (e.g., 100 milliseconds (ms), 200 ms., 500 ms., 1000 ms., etc.)

After these subscription relationships are established, primary process controller 430 transfers to subscriber S1 the value of DATUM 7 at the periodic rate established by subscriber S1. Similarly, primary process controller 430 transfers to subscriber S2 the value of DATUM 8 at the periodic rate established by subscriber S2. Finally, primary process controller 430 transfers to subscriber S3 the values of DATUM 9, DATUM 10, DATUM 11, and DATUM 12 at the periodic rates established by subscriber S3.

During routine operation, the foregoing subscription relationships are established and serviced by primary process controller 430. Secondary process controller 435 remains in a passive role as long as primary process controller 435 operates properly. However, in the event of a failure in primary process controller 430, a "fail over" or "switch over" operation occurs, whereby secondary process controller 435 assumes the active role of receiving subscribed process data from publishers P1, P2 and P3, and transferring the subscribed process data to Subsystems 1–N in process 110. Secondary process controller 435 also assumes the active role of requesting and receiving process data from Subsystems 1–N in process 110 and sending the process data to the subscribers S1, S2 and S3.

A failure in primary process controller 430 may be detected in a variety of ways. An alarm (or failure) signal may be sent from primary process controller 430 to secondary process controller 435 via bus 410. Alternatively, an alarm signal may be sent from primary process controller 430 to secondary process controller 435 via networks links 405 and 415.

An alarm may be an enabling signal or a disabling signal. In the case of an enabling signal, a failure signal is sent only when a failure occurs in primary process controller 430. If this enabling signal is not received, secondary process controller 435 will not be enabled and, hence, will not assume control. In the case of a disabling signal, primary process controller 430 must periodically send a "positive" status signal, such as "GOOD", to secondary process controller 435 indicating that primary process controller 430 is operating properly. As long as the secondary process controller 435 continues to receive positive status signals, secondary process controller 435 is "disabled" from assuming control (i.e., remains inactive). However, if primary process controller 430 stops sending status signals, or if the status signal changes to "FAIL", then secondary process controller 435 becomes active.

In one embodiment of the present invention, secondary process controller 435 may detect a failure in primary process controller 430 by monitoring the message traffic and process data traffic into and out of primary process controller 430 via network link 405. In this scenario, secondary process controller 435 can detect a failure if there is a "timeout" in the network connections for primary process controller 430. In another embodiment of the present invention, secondary process controller 435 may detect a failure in primary process controller 430 by monitoring the message traffic into and out of primary process controller 430 via bus 410. In this scenario, secondary process controller 435 can detect a failure if primary process controller 430 stops communicating with process 110.

In a preferred embodiment of the present invention, secondary process controller 435 substantially instantaneously (<100 ms.) assumes control upon "fail-over" of primary process controller 430, thereby making the fail-over operation minimally disruptive. To facilitate this, secondary process controller 435 maintains in memory 455 a subscribed data table 460 that is a copy of the subscribed data table 450 in memory 445, as well as a copy of the most recent values of publisher process data tracked from primary process controller 430. In some embodiments of the present invention, secondary process controller 435 also maintains in memory 455 a subscription list 461 that is a copy of the subscription list 451 in primary process controller 430. The contents of memories 445 and 455 thus may include the subscribed data tables 450 and 460, the subscription lists 451 and 461, and the operating programs and the configuration data associated with process controller 125. Using this information, secondary process controller 435 can rapidly re-establish subscriptions with others of process controllers 125*a–f* in process facility 100.

Data redundancy is maintained between the memory contents of primary process controller 430 and the memory contents of secondary process controller 435 by data redundancy controller 440. As data is modified in primary process controller 430, the changes are continually reflected into secondary process controller 435, thereby maintaining identical, or nearly identical, copies of "tracked" data in primary process controller 430 and secondary 20 process controller 435. U.S. patent application Ser. No. 08/993,336, incorporated by reference above, discloses an exemplary embodiment of data redundancy controller 440 capable of "synchronizing" the tracked data in primary process controller 430 and secondary process controller 435. Those skilled in the art will recognize that data redundancy controller 440 may be suitably arranged in alternate forms in addition to the form disclosed in U.S. patent application Ser. No. 08/993,336.

Figure 5:
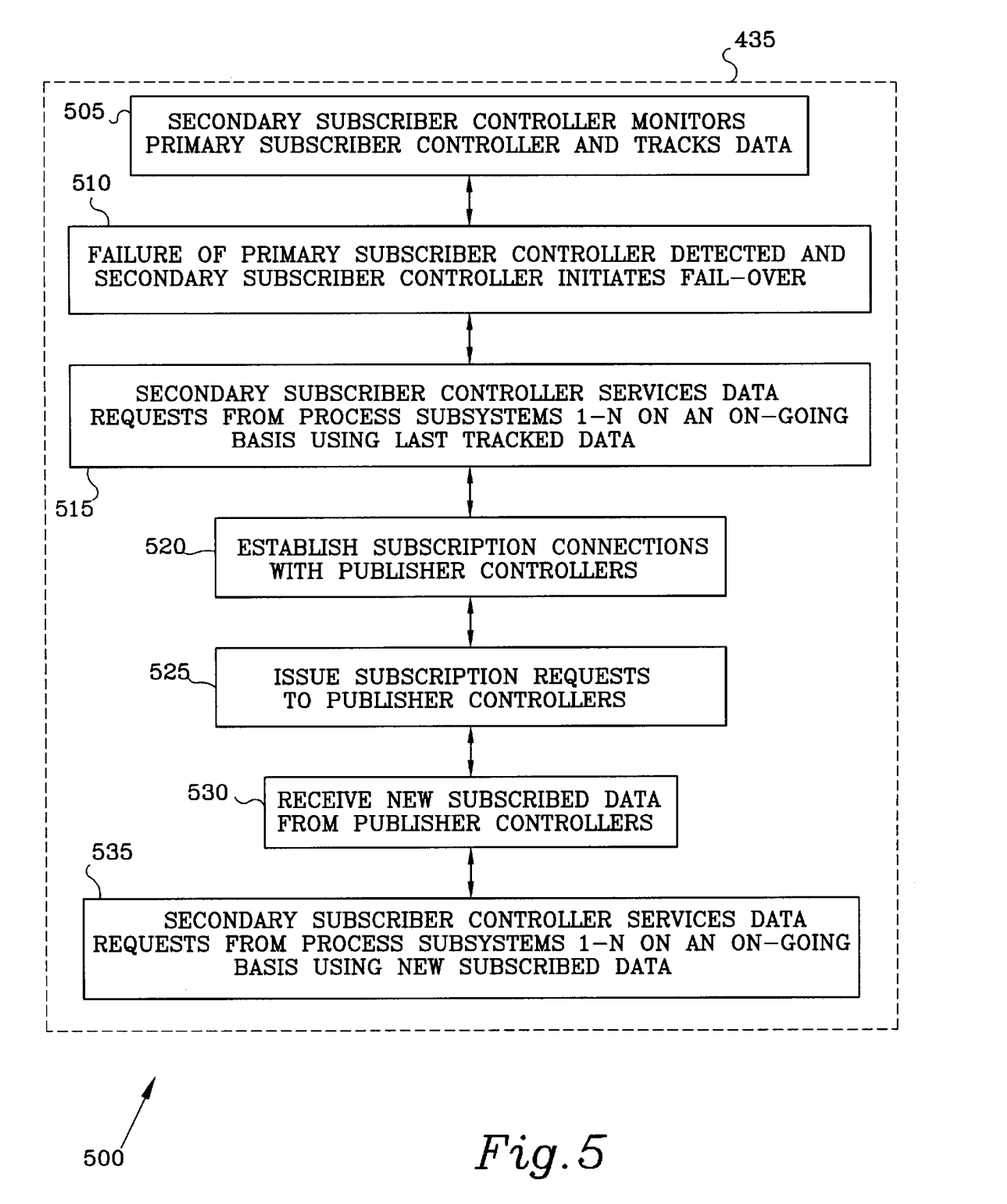
FIG. 5 is a flow diagram illustrating the operation of a secondary process controller during a fail-over operation in a redundant process controller according to one embodiment of the present invention.

FIG. 5 is a flow diagram 500 illustrating the operation of the secondary process controller 435 during a "fail-over" operation in redundant process controller 125 according to one embodiment of the present invention. In the exemplary embodiment shown, redundant process controller 125 acts as a subscriber with respect to process data needed by process 110. During routine operation, subscriber secondary process controller 435 monitors subscriber primary process controller 430 and tracks data changes in memory 445 via data redundancy controller 440 (Step 505). At some point, a failure in subscriber primary process controller 430 occurs. By means of one of the failure detection methods described above, subscriber secondary process controller 435 detects the failure in subscriber primary process controller 430 and initiates a "fail-over" operation (Step 510).

Subscriber secondary process controller 435 begins immediately to service process data requests from subsystems 1–N on an ongoing basis using the most recent copy of the tracked process data in memory 455 (Step 515). This ensures that the subscribed process data needed by process 110 continues to be transferred as needed while subscriber secondary process controller 435 completes the "fail-over" operation.

Subscriber secondary process controller 435 determines the subscription relationships maintained by subscriber primary process controller 430 based on the contents of subscription list 460 in memory 455. Subscriber secondary process controller 435 negotiates new network connections to establish subscription connections with P1, P2 and P3 (Step 520). Subscriber secondary process controller 435 issues new subscription requests to the publisher controllers P1, P2 and P3 according to the subscription relationships defined in subscription list 460 (Step 525). Thereafter, subscriber secondary process controller 435 intermittently receives new subscribed data from publishers P1, P2 and P3 (Step 530). With new subscription relationships established with P1, P2 and P3, subscriber secondary process controller 435 now services process data requests from subsystems 1–N in process 110 using the newly received subscribed process data from P1, P2 and P3 (Step 535).

Figure 6:
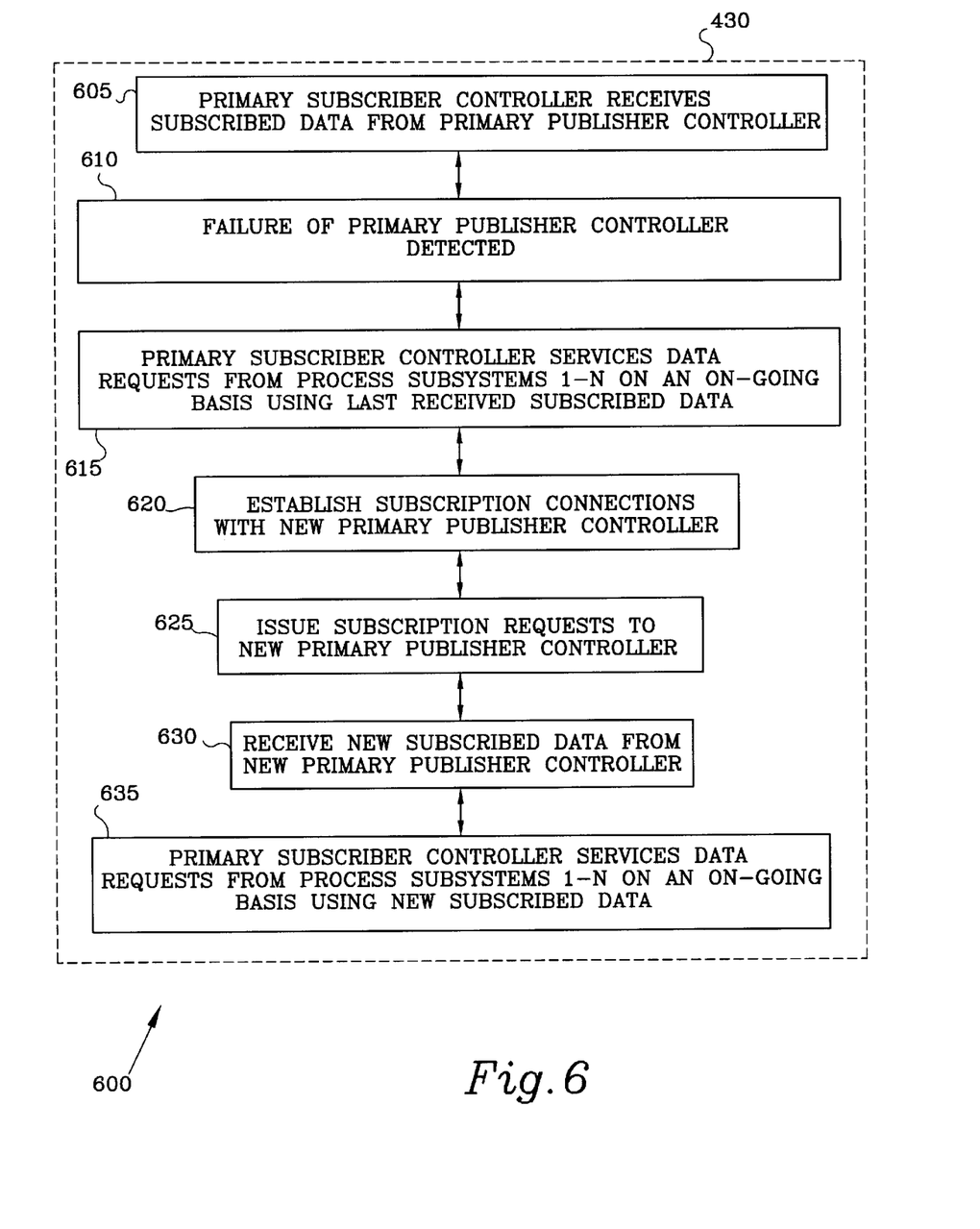
FIG. 6 is a flow diagram illustrating the operation of a primary process controller during a fail-over operation in a redundant process controller according to one embodiment of the present invention.

FIG. 6 is a flow diagram 600 illustrating the operation of a subscriber primary process controller 430 during a "fail-over" operation in a redundant publisher controller according to one embodiment of the present invention. During routine operations, subscriber primary process controller 430 receives subscribed process data from a remote primary publisher controller elsewhere in the network (Step 605). At some point in time, a failure occurs in the remote primary publisher controller that provides subscribed process data to subscriber primary process controller 430. This failure of the remote primary publisher controller may be detected by subscriber primary process controller 430, for example, when the network connection between the remote primary publisher controller and subscriber primary process controller 430 times out (Step 610).

At this point, subscriber primary process controller 430 must re-establish the subscription relationship with the remote secondary publisher controller that initiates a fail-over operation from the now-disabled remote primary publisher controller. Initially, subscriber primary process controller 430 continues to service process data requests from subsystems 1–N using the most recent copy of the subscribed process data stored in memory 445 (Step 615). Subscriber primary process controller 430 retrieves the subscription list data in subscription list 450 for the remote publisher controller that has failed and negotiates a new network connection with the new primary publisher controller (Step 620). When a network connection with the new primary publisher controller is re-established, subscriber primary process controller 430 issues a new subscription request to the new primary (formerly secondary) publisher controller on the remote node (Step 625). Once the subscription relationship connection has been established, subscriber primary process controller 430 initially receives a complete set of new values for all subscribed process data. After the complete set of process data values are received, subscriber primary process controller 430 then periodically receives changed subscribed process data according to the report-by exception scheme from the new primary publisher controller (Step 630). Thereafter, subscriber primary process controller 430 services the process data requests from sub-systems 1–N using the newly received subscribed process data (Step 635).

In the above-described embodiments of the present invention, it is generally the responsibility of a subscriber process controller 125 to create subscription relationship with a publisher process controller 125. This is true whether the subscription relationship is being established for the first time by a subscriber primary process controller, or is being re-established by a subscriber secondary process controller after a failure in the subscriber primary process controller. This is advantageous because it avoids the task of initially configuring a publisher process controller with data regarding all of its subscriber process controller. Process controllers can simply wait for subscription requests to be received and thereby be configured while in operation.

This also allows greater flexibility in the design of process facility 100. A new process 100 and its associated process controller 125 may be added to process facility 100 without having to modify other ones of process controllers 125*a–f* in process facility 100. The new process controller 125 only establishes subscription relationships with the few selected ones of process controllers 125*a–f* from which it needs process data, and process facility 100 may continue to operate.

However, the present invention may be modified so that a publisher process controller 125 establishes subscription relationships with a remote subscriber process controller 125. If a subscription relationship is being established for the first time, the publisher primary process controller 125 must be initially configured with subscriptions lists in order to identify remote subscriber process controller 125 and establish a subscription relationship with it. If the publisher primary process controller fails, the publisher secondary process controller 125 uses subscriptions lists tracked from the publisher primary process controller 125 to re-establish the subscription relationship with the remote subscriber process controller 125.

Similarly, if a subscription relationship is being re5 established after a fail-over operation in the remote subscriber process controller, the publisher primary process controller 125 may use its most recent subscription list to re-establish the subscription relationship with the remote subscriber process controller 125.

Although the present invention and its advantages have been described in detail, those skilled in the art should understand that they can make various changes, substitutions and alterations herein without departing from the spirit and scope of the invention in its broadest form.

What is claimed is:

1. For use in a process facility having a plurality of process systems that produce process data, wherein said process data are gathered by process controllers associated with said process systems and are exchanged by said process controllers via a network, a redundant process controller associated with a first selected process system capable of receiving process data from at least one remote process controller and intermittently transferring said received process data to said first selected process system, said redundant process controller comprising:

a primary process controller having a first memory capable of storing said received process data, wherein said primary process controller is operative to transmit said received process data to said first selected process system;

a secondary process controller having a second memory capable of storing said received process data, wherein said secondary process controller monitors message traffic into and out of said primary process controller to detect a failure of said primary process controller to communicate with at least one process system and is operative, upon detection of a failure of said primary process controller to communicate with said at least one process system, to transmit to said first selected process system said received process data stored in said second memory in lieu of said primary process controller; and a data redundancy controller, wherein said data redundancy controller monitors data stored in said first memory and modifies data stored in said second memory to make said second memory data substantially identical to said first memory data.

2. The redundant process controller as set forth in claim 1 wherein said primary process controller maintains a subscribed data table in said first memory that is used to establish a subscription relationship with said at least one remote process controller, wherein said subscription relationship identifies desired process data gathered by said at least one remote process controller and specifies a rate at which said desired process data is to be transferred to said primary process controller.

3. The redundant process controller as set forth in claim 2 wherein said secondary process controller maintains a copy of said subscribed data table in said second memory and uses said subscribed data table to re-establish said subscription relationship with said at least one remote process controller after said failure in said primary process controller.

4. The redundant process controller as set forth in claim 1 wherein said primary process controller detects failures in said at least one remote process controller and, upon detection of a failure, transmits process data previously stored in said first memory to subscriber process systems.

5. The redundant process controller as set forth in claim 4 wherein said primary process controller detects said failure in said at least one remote process controller by detecting a termination of a network connection with said at least one remote process controller.

6. The redundant process controller as set forth in claim 5 wherein said primary process controller re-establishes said network connection with said at least one remote process controller while transmitting said previously stored process data to said first selected process system.

7. The redundant process controller as set forth in claim 1 wherein said primary process controller, and said secondary process controller upon said failure of said primary process controller, service report-by-exception subscriptions.

8. For use in a process facility having a plurality of process systems that produce process data, wherein the process data are gathered byprocess controllers associated with the process systems and are exchanged by the process controllers via a network, a method of operating a redundant process controller associated with a first selected process system, the redundant process controller comprising a primary process controller, a secondary process controller and a data redundancy controller and capable of receiving process data from at least one remote process controller and intermittently transferring the received process data to the first selected process system, a method comprising the steps of:

storing the received process data in the primary process controller and storing a copy of the received process data in the secondary process controller;

transmitting the received process data from the primary process controller to the first selected process system;

monitoring message traffic into and out of the primary process controller to detect a failure of the primary process controller to communicate with at least one process system; and upon detection of a failure of the primary process controller to communicate with the at least one process system, transmitting the received process data to the first selected process system from the secondary process controller in lieu of said primary process controller, wherein the data redundancy controller monitors process data stored in the primary process controller and modifies process data stored in the secondary process controller to make the process data in the secondary process controller substantially identical to the process data stored in the primary process controller.

9. The method as set forth in claim 8 wherein the primary process controller maintains a subscribed data table in a first memory that is used to establish a subscription relationship with the at least one remote process controller, wherein the subscription relationship identifies desired process data gathered by the at least one remote process controller and specifies a rate at which the desired process data is to be transferred to the primary process controller.

10. The method as set forth in claim 9 wherein the secondary process controller maintains a copy of the subscribed data table in a second memory and uses the subscribed data table to re-establish the subscription relationship with the at least one remote process controller after a failure in the primary process controller.

11. The method as set forth in claim 8 wherein the primary process controller detects failures in the at least one remote process controller and, upon detection of a failure, transmits process data previously stored in the primary process controller to subscriber process systems.

12. The method as set forth in claim 11 wherein the primary process controller detects the failure in the at least one remote process controller by detecting a termination of a network connection with the at least one remote process controller.

13. The method as set forth in claim 12 wherein the primary process controller re-establishes the network connection with the at least one remote process controller while transmitting the previously stored process data to the first selected process system.

14. The method as set forth in claim 8 further comprising:

upon failure of the primary process controller, serving report-by-exception subscriptions previously served by the primary process controller utilizing the secondary process controller.

15. A process control system comprising:

a plurality of process systems capable of producing process data; and a plurality of process controllers associated with plurality of process systems, wherein said plurality of process controllers gather said process data and exchange said process data via a network, wherein at least one of said plurality of process controllers is a redundant process controller associated with a first selected process system said redundant process controller comprising:

a primary process controller having a first memory capable of storing process data received from at least one remote process controller, wherein said primary process controller is operative to transmit said received process data to said first selected process system;

a secondary process controller having a second memory capable of storing said received process data, wherein said secondary process controller monitors message traffic into and out of said primary process controller to detect a failure of said primary process controller to communicate with at least one process system and is operative, upon detection of a failure of said primary process controller to communicate with said at least one process system, to transmit to said first selected process system said process data stored in said second memory in lieu of said primary process controller; and a data redundancy controller, wherein said data redundancy controller monitors data stored in said first memory and modifies data stored in said second memory to make said second memory data substantially identical to said first memory data.

16. The process control system as set forth in claim 15 wherein said primary process controller maintains a subscribed data table in said first memory that is used to establish a subscription relationship with said at least one remote process controller, wherein said subscription relationship identifies desired process data gathered by said at least one remote process controller and specifies a rate at which said desired process data is to be transferred to said primary process controller.

17. The process control system as set forth in claim 16 wherein said secondary process controller maintains a copy of said subscribed data table in said second memory and uses said subscribed data table to re-establish said subscription relationship with said at least one remote process controller after said failure in said primary process controller.

18. The process control system as set forth in claim 16 wherein said primary process controller detects failures in said at least one remote process controller and, upon detection of a failure, transmits process data previously stored in said first memory to said first selected process system.

19. The process control system as set forth in claim 18 wherein said primary process controller detects said failure in said at least one remote process controller by detecting a termination of a network connection with said at least one remote process controller.

20. The process control system as set forth in claim 15 wherein said primary process controller, and said secondary process controller upon said failure of said primary process controller, service report-by-exception subscriptions.

\* \* \* \* \*